April 27, 1965  W. HAMILTON  3,180,303
HATCH COVER ASSEMBLY
Filed April 20, 1962  2 Sheets-Sheet 1

INVENTOR.
WALLACE HAMILTON
BY
*Stephen M. Mihaly*
ATTORNEY

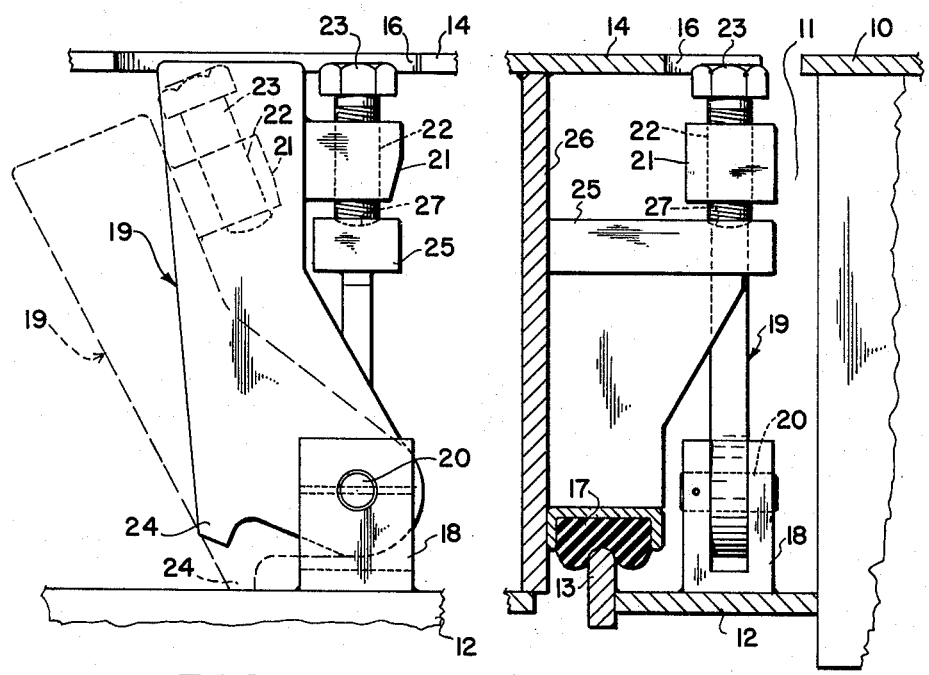

3,180,303
HATCH COVER ASSEMBLY

Wallace Hamilton, Chagrin Falls, Ohio, assignor to PneumoDynamics Corporation, Cleveland, Ohio, a corporation of Delaware
Filed Apr. 20, 1962, Ser. No. 189,020
3 Claims. (Cl. 114—203)

This invention relates, as indicated, to hatch covers and, more particularly, to a hatch cover assembly which is especially well-suited for use with holds or tanks designed to carry liquid cargo, fuel oil, or ballast.

A hatch cover assembly as referred to here includes, in addition to the cover itself, means for latching or dogging the cover when closed, and it is a primary object of the invention to provide for improved latching of the cover, having in mind installations on the particular order noted in which more than merely fastening the cover is involved. As will be appreciated, a cover assembly for use with a hold carrying liquid must also be capable of withstanding potentially substantial pressure exerted against the underside of the cover by movement of the liquid thereagainst, and it has generally been found that considerably more than the usual number of latching or dogging devices should be employed in this type of installation. The latches may, for example, be spaced at one foot intervals about the entire periphery of the cover, and with a cover any substantial size the number of latches is therefore so great the time required for opening and closing the cover becomes of significant concern.

It is therefore an object of the present invention to provide a latching or dogging device in such an assembly which is relatively simple and quick to operate, with an operating time advantage of particular benefit in assemblies requiring a great many latches to be manipulated for the opening of a single cover.

Another object is to provide a hatch cover assembly including a latch which can be readily manipulated with a simple tool and which is easily accessible to such tool in both latched and unlatched conditions.

It is a further object to provide hatch cover latch mechanism including a movable operating member, which, upon disengagement, moves to a pre-determined rest or disengaged position from which it can quickly be restored.

It is also an object of the invention to provide a flush hatch cover installation including latching or dogging devices which can quickly be actuated from the top of the closed cover.

Other objects and advantages of the present invention will become apparent as the following description proceeds.

To the accomplishment of the foregoing and related ends, the invention, then, comprises the features hereinafter fully described and particularly pointed out in the claims, the following descritpion and the annexed drawings setting forth in detail certain illustrative embodiments of the invention, these being indicative, however, of but a few of the various ways in which the principle of the invention may be employed.

In said annexed drawings:

FIG. 2 is a fragmentary sectional view the plane of which is indicated by the line 2—2 in FIG. 1; and FIG. 3 is a further fragmented section as viewed in the plane of line 3—3 of FIG. 1.

Figure 1:
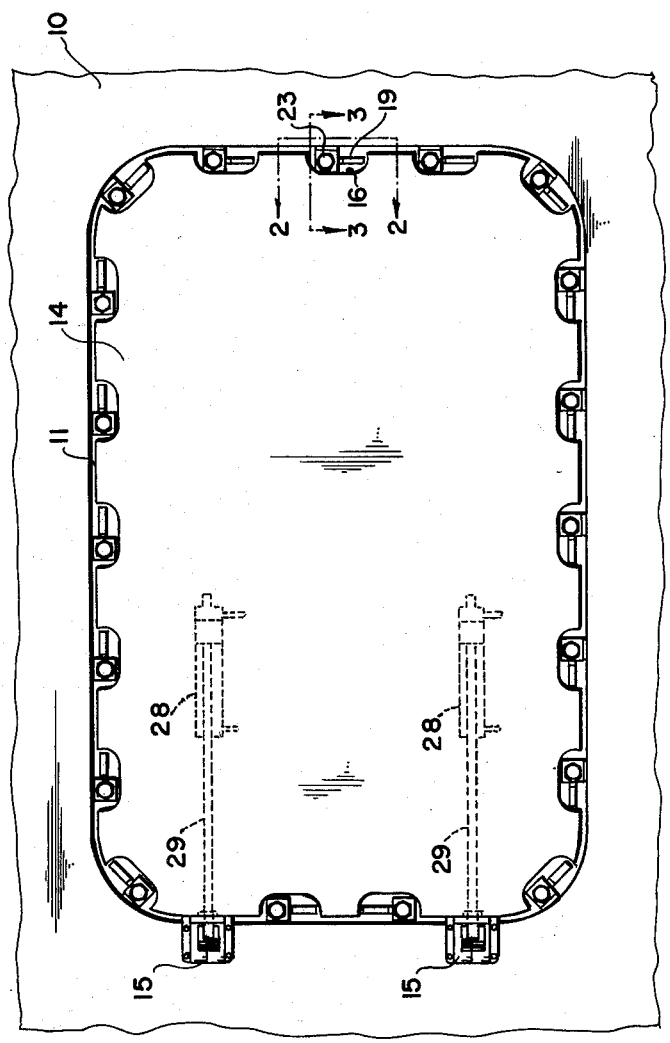
FIG. 1 is a top plan view of a hatch cover assembly in accordance with the present invention.

Referring now to the drawings in detail, reference numeral 10 designates a portion of a ship deck in which an opening 11 is provided for access to a hold or tank beneath this portion of the deck.

As will be evident from FIGS. 2 and 3, there is a continuous horizontal ledge 12 secured to the substructure of the deck at a predetermined distance below the top of the latter and projecting inwardly into the deck opening. A continuous vertically disposed strip 13, having an upper rounded edge as shown, is secured against the inner edge of the ledge 12 and similarly extends about the opening for a purpose to be described.

A hatch cover 14 of appropriate size and shape for closure of the deck opening 11 is secured at one end of the deck by a pair of hinges 15, with this cover moreover having its usual understructure received in the opening so that the top surface of the closed cover is flush with the deck. The edge of the cover is relieved at regularly spaced intervals to provide a series of recesses 16 about its periphery, and a continuous sealing strip 17 including a resiliently deformable element is secured about the cover at a lower elevation for engagement with the stationary strip 13 when the cover is closed and hence the sealing of the same. At the occurrence of each recess 16 in the edge of the cover, there is a latching or dogging device comprising a bracket 18 secured to the ledge 12 and projecting upwardly therefrom. A latch member 19 is pivotally connected to each bracket 18 by a horizontal pin 20 the axis of which is generally normal to the boundary of the opening 11. Each latch member 19 is formed with an intergral lug 21 having a threaded opening 22 therethrough, and a bolt 23 is threaded in such opening. When the latch member or arm 19 is upright, the bolt is substantially vertical with its head uppermost.

It is to be noted that the latch member or arm 19 is of a particular configuration whereby there is a foot 24 at the bottom edge for engagement with the ledge 12 in the manner shown by the dashed outline in FIG. 2. The member is weighted so that it will fall automatically from the upright position when free to the position indicated by this dashed outline, and the noted engagement of the foot 24 thereby arrests such movement to hold the latch member in a predetermined rest position. The head end of the bolt 23 is still accessible at the top of the hatch cover 14 in the rest condition, with the significance of this feature more clearly apparent from the description of the operation of the mechanism to be set forth below. However, it should also be noted here that the latch member 19 has an extending upper end portion, that is, projecting above the lug 21, which partially fills the associated recess 16 of the cover when such member is upright.

Each of the latch mechanisms about the periphery of the cover is completed by a keeper 25 secured to a vertical structural member 26 of the cover and projecting outwardly into the path of movement of the associated latch member 19. A relief 27 is provided in the upper surface of the projecting portion of each keeper to receive the inner end of the bolt 23 carried by the latch member 19 of the assembly.

It will be understood that the hatch cover 14 may be moved between its closed and opened conditions in any suitable manner. Since it is generally preferred to employ power means for controlling such movement, I have indicated in FIG. 1 a pair of hydraulic cylinders 28 which would be pivotally connected at their outer ends to the underside of the cover and have actuator rods 29 extending respectively to pivotal connections with suitable components of the hinges 15 below the hinge axis, so that the actuation of such hydraulic units causes the cover to move as desired. Such power systems are known, and the components mentioned are generally illustrative only and do not form a part of the present invention.

In the operation of the new hatch cover assembly starting with the hatch cover open, the several latch members or arms 19 are in their relaxed or rest positions determined by the feet 24 bearing against the ledge 12 about the deck opening 11. When the cover is now closed, the several keepers 25 are brought over the respectively associated brackets 18 and the seal 17, of course, engages the stationary rail or strip 13. The head of each bolt 23 is accessible at each cover recess 16, and a conventional socket wrench, for example, with a T-handle, can thus easily be engaged on a particular bolt head. By means of this engagement and manipulation of the wrench, the particular latch member 19 is swung to the upright position, the bolt 23 (normally retracted) is advanced by turning of the wrench downwardly into the seat or relief 27 of the associated hatch cover keeper 25 and the bolt is forced thereagainst firmly to clamp or latch the given portion of the cover periphery to the deck structure. All of the latching or dogging devices are similarly actuated, and, as indicated earlier, the several recesses 16 are partially filled by the almost flush top portions of the operative latch members.

The manner in which the cover is opened will be obvious, and it will be appreciated that it is necessary only to retract the bolts sufficiently to clear the keepers. When this clearance is provided, at each device, and the wrench removed, the freed latch member 19 will automatically fall to the stop or rest position to provide the necessary clearance, with the latch members being held accessible for subsequent relatching.

This last consideration is of particular significance, since a principal object is to reduce the time which would ordinarily be required to latch and unlatch the cover. A freely swinging latch member if permitted to fall fully to the ledge would defeat this purpose, since such a member would have to be retrieved by hand before actuation by the tool employed. With the new latch, it should not be necessary to do more than execute quick bolt engagement and actuation with the wrench as described.

Other modes of applying the principle of the invention may be employed, change being made as regards the details prescribed, provided the features stated in any of the following claims or the equivalent of such be employed.

I, therefore, particularly point out and distinctly claim as my invention:

1. In combination with deck structure having an opening therein, a hatch cover assembly therefor comprising a cover structure adapted to be moved to and from a closed position in which the cover structure closes said opening in the deck structure, latch means for securing the closed cover structure to the deck structure, said latch means comprising a first latch member attached to the cover structure at a generally peripheral location of the same and a cooperable second latch member attached to the deck structure, the attachment of one of said first and second latch members being pivotal to provide swinging movement thereof about a fixed axis at said attachment, said one member further having a stop portion engageable with the structure to which said one member is attached for limiting the relative movement thereof, the one member being swingable when the cover structure is in closed condition between operative and retracted positions wherein it is respectively substantially upright and angularly displaced on said fixed axis a small degree to one side of the substantially upright position, with the stop portion of said one member engaging the associated attaching structure when thus displaced for supporting said one member in said retracted position of the same, said one latch member also having a latching portion which overlies a portion of the other of said first and second latch members in said operative position and is spaced therefrom to clear said other member when moved to and from said retracted position, and pressure means carried by said latching portion of said one member and overlying said other member in the substantially upright position of said one member, with said pressure means projecting adjacent the top of said one member and being actuatable from the top of the assembly into and out of forcible engagement with said other member respectively for clamping and releasing of the first and second members, the displacement of said one member from the operative to the retracted position being so limited by the stop means engagement as to maintain the pressure means readily accessible from the top of the assembly in the retracted position as well as in the operative position.

2. The combination set forth in claim 1 wherein said one member is weighted so as to fall freely from said operative position to said retracted position in response to said pressure means being moved out of engagement with said other latch member.

3. The combination set forth in claim 1 wherein said one latch member is attached to the deck structure, with which the stop portion thereof is engaged to support said one member in the retracted position of the same.

References Cited by the Examiner

UNITED STATES PATENTS

| | | | |
|---|---|---|---|
| 2,917,017 | 12/59 | Stransky | 292—256.5 |
| 3,036,851 | 5/62 | Takacs | 292—256.5 |

FOREIGN PATENTS

| | | |
|---|---|---|
| 1,112,287 | 11/55 | France. |
| 760,991 | 3/54 | Germany. |
| 434,212 | 8/35 | Great Britain. |

MILTON BUCHLER, *Primary Examiner.*

ANDREW H. FARRELL, *Examiner.*